Dec. 9, 1947.　　　W. A. MILLER　　　2,432,204
PULSE MODULATION SYSTEM
Filed Jan. 5, 1944　　　3 Sheets-Sheet 1
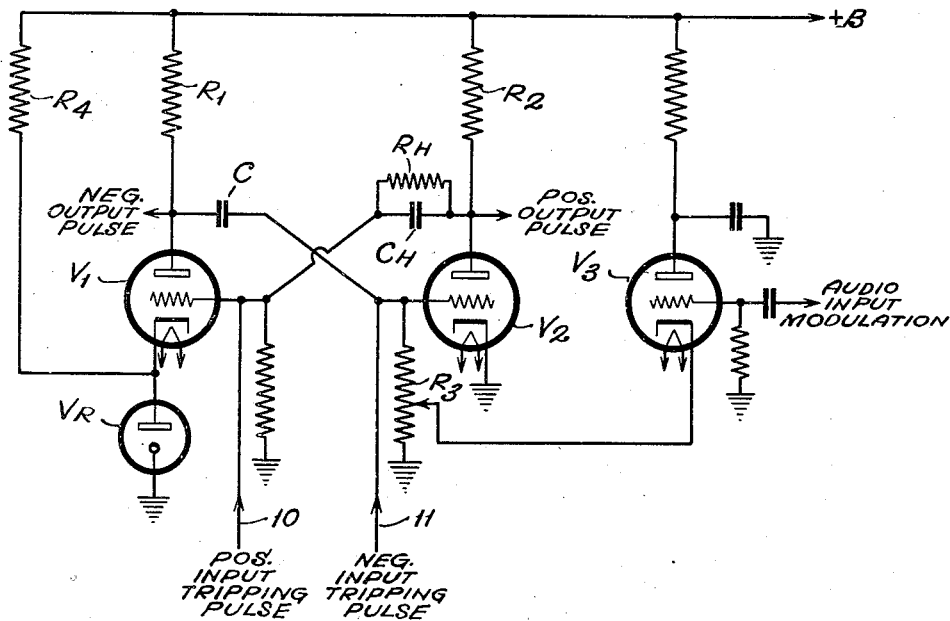
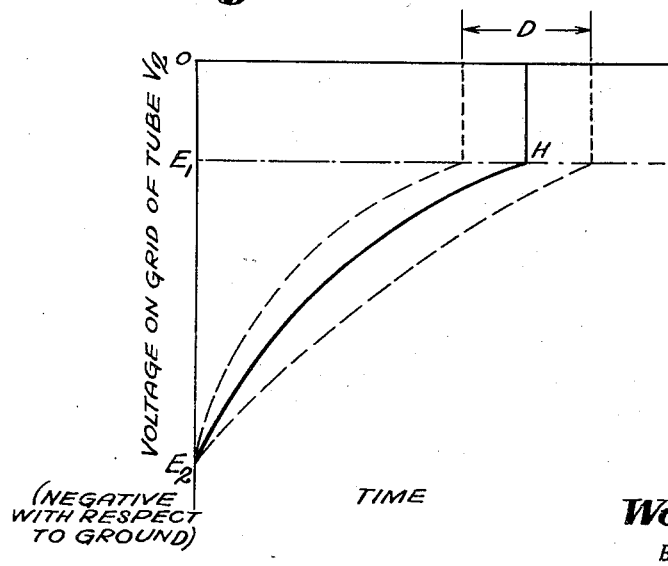
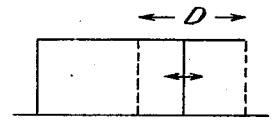
INVENTOR.
William A. Miller
BY
H. S. Grover
ATTORNEY.

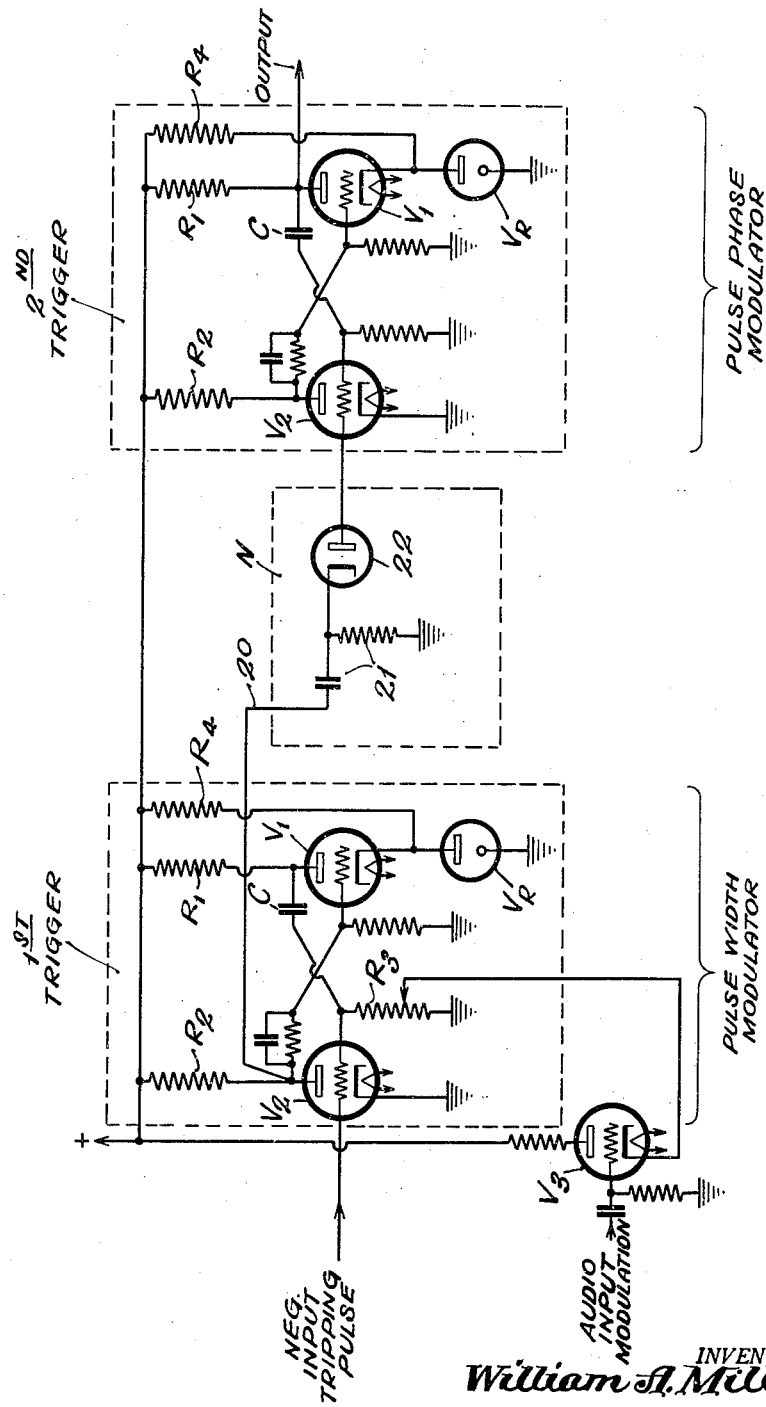

Patented Dec. 9, 1947

2,432,204

UNITED STATES PATENT OFFICE 2,432,204

PULSE MODULATION SYSTEM

William A. Miller, Port Jefferson, N. Y., assignor to Radio Corporation of America, a corporation of Delaware Application January 5, 1944, Serial No. 517,065

11 Claims. (Cl. 179—171.5)

This invention relates to a method of and means for generating pulses and for modulating the width and/or phase of these pulses.

An object of the present invention is to provide a simplified system for generating pulses having a constant pulse rate but whose width varies in accordance with signal modulation.

Another object of the invention is to enable the simple and efficient conversion of width modulated pulses to phase modulated pulses.

A further object is to provide a pulse modulation system in the form of an electronic trigger circuit having one degree of electrical stability, and whose active time varies in dependence upon the modulation.

A more detailed description of the invention follows in conjunction with a drawing wherein:

Fig. 1 shows one circuit embodiment embodying the principles of the present invention;

Fig. 2 is a graph given to explain the operation of the circuit of Fig. 1;

Figure 4:
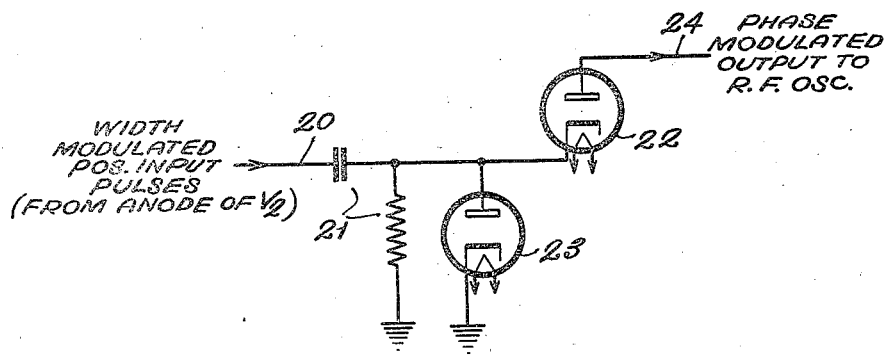
Figure 5:
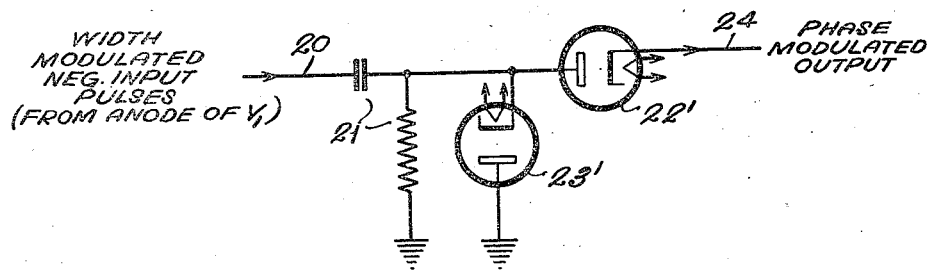

Fig. 3 generally shows the wave form of a pulse generated by the circuit of Fig. 1 and whose width is variable over a range D in dependence upon the signal modulation;

Figs. 4 and 5 illustrate two circuits for converting modulated width pulses of different polarities to phase modulated pulses; and Fig. 6 illustrates another circuit embodiment employing two trigger circuits for converting width modulated pulses to phase modulated pulses.

Referring to Fig. 1, there is shown an electronic trigger circuit of the self-restoring type comprising a pair of vacuum tubes V1 and V2 whose grid and anode electrodes are interconnected regeneratively to form a trigger circuit having one degree of electrical stability. Resistors R1 and R2 are connected between the positive terminal +B of a source of anode polarizing potential and the anodes of tubes V1 and V2, respectively. The anode of tube V1 is connected to the grid of tube V2 through a condenser C, while the anode of tube V2 is connected to the grid of tube V1 through a resistor-shunt condenser arrangement $Rh$, $Ch$. The grid of tube V2 is connected to ground through a resistor R3. The cathode of tube V1 is connected to ground through a voltage regulator tube VR. This cathode is connected to the positive terminal +B through a resistor R4. By virtue of the fact that the cathode of the tube V1 is supplied with a positive potential, it will be seen that the grid of tube V1 is thus negative with respect to the cathode. This negative bias on the grid of tube V1 is sufficient to normally bias this tube to cut-off.

Normally, in the operation of the trigger circuit of Fig. 1, tube V1 is non-conductive while tube V2 is conductive. This condition of operation, wherein tube V1 is normally non-conductive and tube V2 is conductive is called the stable state. In the active or unstable state, however, the current passing conditions of the tubes V1 and V2 are reversed from that just described. After an interval of time in the active state, depending in part upon the time constants of the system, the trigger circuit will restore itself to the stable state. It will thus be seen that the trigger circuit has only one degree of electrical stability. In order to change the trigger circuit from the stable state to the active state, an input pulse of positive polarity can be applied to the grid of tube V1 over lead 10, of a magnitude sufficient to overcome the negative bias on the grid of V1 and cause this tube to pass current. In the alternative, instead of supplying an input pulse of positive polarity to the grid of tube V1, the tripping action of the trigger circuit can be effected by supplying a negative input tripping pulse to the grid of tube V2 over lead 11 of sufficient polarity to cut-off the flow of current through the tube V2. The application of either one of these tripping pulses of the polarities above identified to the particular grids specified will cause the current passing conditions of the two tubes to reverse and will place the trigger circuit in the active state. When tube V1 starts to pass current, current will flow through the resistor R1 and thereby decrease the voltage applied to the series combination of condenser C and resistor R3, thus applying a negative voltage to the grid of tube V2. This negative voltage applied to the grid of tube V2 will decrease the current flow in resistor R2, as a result of which a positive voltage will be applied to the grid of tube V1 through the resistor-condenser combination $Rh$, $Ch$. This regenerative action will cause the tube V1 to conduct and the tube V2 to cease conducting, thus causing the trigger circuit to change from its stable state to its active state. The time constant of condenser C and resistors R1 and R3, and the internal anode resistance of tube V2, determine the time interval of the active state. In the stable state of the trigger circuit, the condenser C will be charged to the full value of potential +B, whereas in the active state of the trigger circuit the condenser C will be charged negatively and will discharge over a circuit including resistor R1 and the anode impedance of tube V1 in parallel and also through resistor R3. When the charge on condenser C has dissipated to a critical value, such that its discharge current no longer develops sufficient potential difference across resistor R3 to maintain the tube V2 biased at or beyond cut off, then the current conductive states of the two tubes will be reversed and the trigger circuit will be restored to its stable state. Rectangular wave output pulses are obtainable from either of the anodes of tubes V1 or V2. Thus, a negative output pulse is obtainable from the anode of tube V1 while a positive output pulse is obtained from the anode of tube V2.

Fig. 2 graphically illustrates the operation of the trigger circuit comprising tubes V1 and V2 of Fig. 1. The ordinate of the graph of Fig. 2 represents the voltage on the grid of tube V2, while the abscissa represents the time. The application of a tripping pulse to the trigger circuit of Fig. 1 of a desired polarity to trip the trigger circuit to its active state will drive the bias on the grid of the normally conductive tube V2 from zero down to a value E2. The horizontal line labeled E1 in Fig. 2 represents the cut off grid bias voltage of tube V2. Immediately after the trigger circuit has been tripped, the condenser C is given a negative charge sufficient to drive the grid bias on the tube V2 down to the value E2. As the charge on the condenser C diminishes, the bias on the grid of tube V2 will start to rise and follow substantially the curve shown by the solid line of Fig. 2. Normally, the grid bias on the tube V2 during the active period of the trigger will rise from the value E2 to the value E1, in accordance with the solid curved line, and then suddenly change to the zero grid bias value when the trigger circuit restores itself to normal. It will be noted that at point H on the solid line curve of Fig. 2, the voltage on the grid of tube V2 is equal to the cut-off grid bias of tube V2. Any further positive increase of grid voltage on V2 will cause current to flow in tube V2 which by virtue of the regenerative action of the trigger circuit causes the trigger to return to the stable state.

Since the rate of discharge of condenser C controls the active period or the interval during which the trigger is in the active state, so to speak, it will be seen that any variation of this active period will produce a variation in the width of the pulse obtainable from the trigger circuit. The invention makes use of this phenomenon to obtain pulse width modulation and this is achieved by varying the discharge rate of the condenser C in accordance with audio frequency signal modulation.

Pulse width modulation is obtained in the circuit of Fig. 1 by means of a modulator and vacuum tube V3 whose anode is connected to the +B supply and whose cathode is connected by means of an adjustable tap to resistor R3. The audio input modulation is supplied to the grid of tube V3 to control the dynamic anode resistance of this modulating tube. Thus, by means of the audio input modulation applied to the grid of tube V3, it is possible to throw in more or less shunt resistance to the variable resistor R3, thus varying the discharge rate of condenser C and hence the active time of the trigger. Stated in another way, the audio frequency input to the modulator tube couples in varying amounts of the high voltage supply +B to the resistor R3, thus changing the voltage to which the condenser C can discharge. This is because more or less cathode current flows through tube V3 to cause the potential of the tap on resistor R3 to vary as the grid voltage of the modulator tube changes. The width of the output pulse obtainable from the trigger circuit is thus caused to vary over a range D, as shown in Fig. 2.

Fig. 3 illustrates, by way of example only, the different widths of the output pulses obtainable from Fig. 1. The solid line illustrates the duration of an output pulse without any modulation applied to the modulator tube V3. The dotted lines illustrate the extreme lengths in width of the output pulse for maximum modulation in the positive and negative directions. This range of pulse width is shown by D. The double arrow on the trailing edge of the solid line indicates that the width of the output pulse is variable in both directions.

In the operation of the system of Fig. 1, it is preferred that the tripping pulse be of positive polarity and applied to the grid of tube V1 over lead 10, in order that the tripping and modulating voltages be applied to the grids of different tubes. However, when a negative input tripping pulse is applied to the grid of tube V2, it will be seen that both the tripping and modulating voltages are applied to the same grid of tube V2. The tripping pulses should be recurring and have a constant pulse rate, depending upon the band width of the intelligence to be transmitted. Theoretically, the pulse rate should be at least twice the highest modulation frequency, although it is preferred that this pulse rate be higher than this amount. Thus, if speech modulation is impressed on the modulator tube V3, in the range from zero to 5000 cycles, the tripping rate of the input pulse to the trigger circuit should be at least 10,000 cycles. The duration of the trigger output pulse can vary over a wide range provided that it does not overlap with 100% modulation. It is preferred, though not necessary, that the output pulses from the trigger circuit be short compared to the intervals between them.

The system of Fig. 1 will generally be used to control, by means of its output pulses, the generation of pulses of radio frequency energy from a radio frequency transmitter. The pulses produced by the radio frequency oscillator will have a constant amplitude but variable width (i. e., variable duration) depending upon the modulation applied to the system of Fig. 1. As far as the radio frequency oscillator is concerned, it will merely see a series of pulses having variable lengths and whose starting edges have a fixed recurrence rate.

Let us now consider the aspect of pulse phase modulation. The pulse rate is constant and determined by the tripping voltages. Assuming zero modulating frequency, the output pulses are all equally spaced and occur at the tripping frequency rate. If the modulating frequency is now made other than zero, the output pulses will be displaced from the zero position in such a manner that the average repetition rate is unchanged but instantaneously the phase relation between the output pulse and the tripping pulse is changed. The amount of phase shift is proportional to the amplitude of the modulation voltage. This means that the excursion of the pulse is independent of the modulating frequencies, i. e., ten volts alternating current at 500 cycles will cause the same excursion of the output pulse from the undeviated position as ten volts alternating current at 1000 cycles. But, in the former example, the excursion occurs at a 500 cycle rate while in the latter it occurs at a 1000 cycle rate.

Thus, the pulse repetition rate does not change except as in the case of ordinary frequency modulation, while the excursion rate does change with modulation frequency.

This pulse phase modulation might be considered as resulting in an effective frequency modulation since the time interval (hence repetition frequency) is varied from pulse to pulse.

Fig. 4 shows one way in which positive polarity pulses of variable width obtained from the system of Fig. 1 can be converted to phase modulated pulses. These positive pulses whose width is modulated, are supplied to lead 20 and differentiated in the condenser-resistance circuit labeled 21. The differentiator circuit serves to provide extremely short duration, steep sloped impulses from the starting and trailing edges of the pulse applied to lead 20. The arrangement of the diodes 22 and 23 enables only those steep sloped pulses to pass through to lead 24 which are derived from the trailing edges of the input pulses supplied to lead 20. The short duration positive impulses from the differentiator circuit, representative of the starting edge of the input pulses, are passed to ground through the diode 23, while the short duration-steep sloped negative impulse from the differentiator 21 is passed on to lead 24 through the diode 22. It will thus be seen that the pulses supplied to lead 24 vary from the fixed period of the tripping pulses supplied to the trigger of Fig. 1 by an amount of time proportional to the modulation. These phase modulated pulses in lead 24 can then be used to control the generation of pulses of radio frequency energy from a radio frequency oscillator in known manner. The output of this radio frequency oscillator will then comprise constant amplitude pulses of radio frequency energy which vary in time (extent of deviation) depending upon the amplitude of modulation.

Fig. 5 is a modification of the system of Fig. 4 and shows how to convert negative width modulation pulses obtained from the system of Fig. 1 into phase modulated output pulses. The negative pulses are applied to lead 20 and differentiated by circuit 21 in the same manner as in Fig. 4. The electrode arrangement of the diodes 23' and 22' are reversed from those shown in Fig. 4, however, in order that only those short duration, steep sloped pulses representative of the trailing edges of the applied width modulated pulses be passed through to lead 24. As in the case of Fig. 4, lead 24 will customarily be connected to a radio frequency transmitter in order to control the generation of pulses of radio frequency energy.

Fig. 6 shows another embodiment of a pulse modulation system of the invention employing two electronic self-restoring trigger circuits of the same general type shown in Fig. 1. The same reference characters have been employed in Figs. 1 and 6 to designate the same parts. The trigger circuits of Fig. 6 function in the same general manner described above in connection with Fig. 1. The pulse width modulator of Fig. 6, labeled as such, is the same as that of Fig. 1. A negative tripping pulse is shown employed in Fig. 6 for tube V2, although it will be understood that, if desired, a positive tripping pulse can be employed for tube V1. As stated before, tube V1 is normally biased to cut off, while tube V2 is normally conducting in the stable state of the trigger. In the active state, however, tube V1 is conducting and tube V2 non-conducting.

The two triggers of Fig. 6 are coupled together by means of a network including lead 20, a differentiator circuit 21 and a diode 22. By applying the output of the first trigger through network N to the second trigger, so that when the first trigger returns to the stable state from the active state it trips the second trigger, the output of the second trigger will be phase modulated with respect to the tripping frequency.

What is claimed is:

1. A pulse width modulation system comprising an electron discharge device trigger circuit having one degree of electrical stability, said trigger circuit being characterized by a stable state and an active state, and comprising a pair of multi-electrode structures, each having an anode, a cathode, and a grid, connections interconnecting said anodes and grids regeneratively, one of said electrode structures being adapted to pass current while the other electrode structure is non-conductive in the stable state of said trigger circuit, and vice versa in the active state of said trigger circuit, a source of recurring tripping pulses connected to said trigger circuit for changing it from the stable to the active state to thereby cause said trigger circuit to produce substantially rectangular wave form pulses, a resistor connected between the grid and cathode of that electrode structure which passes current in the stable state of the trigger circuit, a modulator tube having a cathode connected to said resistor and a control electrode connected to a source of signal modulation, whereby the interelectrode impedance of said modulator tube varies the active period of said trigger circuit as a function of the signal modulation, and means for utilizing only the trailing edges of the pulses produced by said trigger circuit.

2. A pulse width modulation system comprising an electron discharge device trigger circuit having one degree of electrical stability for producing substantially rectangular wave form pulses, said trigger circuit being characterized by a stable state and an active state and comprising a pair of multi-electrode structures each having an anode, a cathode, and a grid, connections interconnecting said anodes and grids regeneratively, one of said electrode structures being adapted to pass current while the other electrode structure is non-conductive in the stable state of said trigger circuit, and vice versa in the active state of said trigger circuit, a source of recurring tripping pulses connected to the grid of that electrode structure which is non-conductive in the stable state of said trigger circuit, a resistor connected between the grid and cathode of that electrode structure which passes current in the stable state of the trigger circuit, a modulator tube having a cathode connected to a point intermediate the ends of said resistor and a control electrode connected to a source of signal modulation, whereby the interelectrode impedance of said modulator tube varies the active period of said trigger circuit as a function of the signal modulation, and means for utilizing only the trailing edges of the pulses produced by said trigger circuit.

3. A pulse width modulation system comprising an electron discharge device trigger circuit having one degree of electrical stability, said trigger circuit being characterized by a stable state and an active state and comprising first and second electrode structures each having an output electrode, a grid and a cathode, a source of anode polarizing potential having a positive terminal connected to said output electrodes, impedance elements interconnecting the grid of each electrode structure with the output electrode of the other structure, means for biasing the grid of said first structure to a value below cut off in the stable state of said trigger circuit, said second structure passing current during said stable state, an impedance element connecting the grid and cathode of said second structure, a modulator tube having a cathode coupled to said last impedance element and a control electrode coupled to a source of audio frequency modulation, said modulator tube having an anode electrode connected to said same source of anode polarizing potential, and a source of recurring tripping pulses of positive polarity connected to the grid of said first structure to thereby cause said trigger circuit to produce substantially rectangular wave form pulses, and means for utilizing only the trailing edges of the pulses produced by said trigger circuit.

4. A pulse width modulation system comprising an electron discharge device trigger circuit having one degree of electrical stability, said trigger circuit being characterized by a stable state and an active state and comprising first and second electrode structures each having an output electrode, a grid and a cathode, a source of anode polarizing potential having a positive terminal connected to said output electrodes, impedance elements interconnecting the grid of each electrode structure with the output electrode of the other structure, means for biasing the grid of said first structure to a value below cut off in the stable state of said trigger circuit, said second structure passing current during said stable state, an impedance element connecting the grid and cathode of said second structure, a modulator tube having a cathode coupled to said last impedance element and a control electrode coupled to a source of audio frequency modulation, said modulator tube having an anode electrode connected to said same source of anode polarizing potential, and a source of recurring tripping pulses of negative polarity connected to the grid of said second structure to thereby cause said trigger circuit to produce substantially rectangular wave form pulses, and means for utilizing only the trailing edges of the pulses produced by said trigger circuit.

5. A pulse phase modulator system comprising a source of recurring pulses of variable width, a differentiator coupled to said source for producing shorter duration and steep sloped impulses from the starting and trailing edges of the recurring variable width pulses, a pair of diodes each having a cathode and an anode, a direct connection between the cathode of one diode and the anode of the other diode, means coupling said differentiator to said last connection, a connection from the other electrode of one of said two diodes to ground and a connection from the other electrode of the other diode to a utilization circuit.

6. A pulse phase modulator system comprising a source of recurring pulses of positive polarity and of variable width, a differentiator coupled to said source for producing shorter duration and steep sloped impulses from the starting and trailing edges of the recurring variable width pulses, a pair of diodes each having a cathode and an anode, a direct connection between the cathode of one diode and the anode of the other diode, means coupling said differentiator to said last connection, a connection from the anode of said one diode to a utilization circuit, and a connection from the cathode of the other diode to ground, whereby the pulses of variable duration are converted to phase modulated pulses available to said utilization circuit.

7. A pulse phase modulator system comprising a source of recurring pulses of negative polarity and of variable width, a differentiator coupled to said source for producing shorter duration and steep sloped impulses from the starting and trailing edges of the recurring variable width pulses, a pair of diodes each having a cathode and an anode, a direct connection between the cathode of one diode and the anode of the other diode, means coupling said differentiator to said last connection, a connection from the anode of said one diode to ground, and a connection from the cathode of the other diode to a utilization circuit, whereby the pulses of variable duration are converted to phase modulated pulses available to said utilization circuit.

8. A pulse modulation system comprising an electron discharge device trigger circuit having one degree of electrical stability, said trigger circuit being characterized by a stable state and an active state and comprising a pair of multi-electrode structures whose anodes and grids are interconnected regeneratively, one of said electrode structures being adapted to pass current while the other electrode structure is non-conductive in the stable state of said trigger circuit, and vice versa in the active state of said trigger circuit, a source of recurring tripping pulses connected to said trigger circuit for changing it from the stable to the active state, a resistor connected between the grid and cathode of that electrode structure which passes current in the stable state of the trigger circuit, a modulator tube having a cathode connected to said resistor and a control electrode connected to a source of signal modulation, whereby the interelectrode impedance of said modulation tube varies the active period of said trigger circuit as a function of the signal modulation, to thereby produce recurring variable width output pulses from said trigger circuit, a differentiator circuit coupled to an output electrode of said trigger circuit for producing shorter duration and steep sloped impulses from the starting and trailing edges of the recurring variable width pulses, a pair of diodes each having a cathode and an anode, a direct connection between the cathode of one diode and the anode of the other diode, means coupling said differentiator to said last connection, a connection from the other electrode of one of said two diodes to ground, and a connection from the other electrode of the other diode to a utilization circuit.

9. A pulse modulation system comprising an electron discharge device trigger circuit having one degree of electrical stability, said trigger circuit being characterized by a stable state and an active state and comprising a pair of multi-electrode structures each having an anode, a cathode and a grid, connections interconnecting said anodes and grids regeneratively, one of said electrode structures being adapted to pass current while the other electrode structure is non-conductive in the stable state of said trigger circuit, and vice versa in the active state of said trigger circuit, a source of recurring tripping pulses connected to said trigger circuit for changing it from the stable to the active state, a resistor connected between the grid and cathode of that electrode structure which passes current in the stable state of the trigger circuit, a modulator tube having a cathode connected to said resistor and a control electrode connected to a source of signal modulation, whereby the interelectrode impedance of said modulation tube varies the active period of said trigger circuit as a function of the signal modulation, to thereby produce recurring variable width output pulses from said trigger circuit, a differentiator circuit coupled to an output electrode of said trigger circuit for producing shorter duration and steep sloped impulses from the starting and trailing edges of the recurring variable width pulses, a utilization circuit, a diode having one electrode coupled to said differentiator and the other electrode coupled to said utilization circuit, whereby said variable width pulses are converted to phase modulated pulses, said diode being so arranged that the pulses produced only from said trailing edges are passed on to said utilization circuit.

10. A pulse modulation system comprising an electron discharge device trigger circuit having one degree of electrical stability, said trigger circuit being characterized by a stable state and an active state and comprising a pair of multi-electrode structures each having an anode, a cathode and a grid, connections interconnecting said anodes and grids regeneratively, one of said electrode structures being adapted to pass current while the other electrode structure is non-conductive in the stable state of said trigger circuit, and vice versa in the active state of said trigger circuit, a source of recurring tripping pulses connected to said trigger circuit for changing it from the stable to the active state, a resistor connected between the grid and cathode of that electrode structure which passes current in the stable state of the trigger circuit, a modulator tube having a cathode connected to a variable tap on said resistor and a control electrode connected to a source of signal modulation, whereby the interelectrode impedance of said modulation tube varies the active period of said trigger circuit as a function of the signal modulation, to thereby produce recurring variable width output pulses having starting edges occurring at regular time intervals and trailing edges occurring at variable time intervals, and means responsive to said output pulses for producing phase modulated pulses from only said trailing edges, said means including a differentiator circuit and an electron discharge device responsive solely to pulses of predetermined polarity produced by said differentiator circuit.

11. A pulse modulation system comprising an electron discharge device trigger circuit having one degree of electrical stability, said trigger circuit being characterized by a stable state and an active state and comprising a pair of multi-electrode structures each having an anode, a cathode, and a grid, connections interconnecting said anodes and grids regeneratively, one of said electrode structures being adapted to pass current while the other electrode structure is non-conductive in the stable state of said trigger circuit, and vice versa in the active state of said trigger circuit, a source of recurring tripping pulses connected to said trigger circuit for changing it from the stable to the active state, a resistor connected between the grid and cathode of that electrode structure which passes current in the stable state of the trigger circuit, a modulator tube having a cathode connected to a variable tap on said resistor and a control electrode connected to a source of signal modulation, whereby the interelectrode impedance of said modulation tube varies the active period of said trigger circuit as a function of the signal modulation, to thereby produce recurring variable width output pulses having starting edges occurring at regular time intervals and trailing edges occurring at variable time intervals, and means responsive to said output pulses for producing phase modulated pulses from only said trailing edges, said means including a differentiator circuit and an electron discharge device responsive solely to pulses of predetermined polarity produced by said differentiator circuit, and another trigger circuit similar to said first trigger circuit coupled to said last electron discharge device, the pulses passed by said last electron discharge device having such sense and magnitude as to trip said other trigger circuit.

WILLIAM A. MILLER.

REFERENCES CITED

The following references are of record in the file of this patent:

UNITED STATES PATENTS

| Number | Name | Date |
|---|---|---|
| 2,338,512 | Harmon | Jan. 4, 1944 |
| 2,297,926 | Usselman | Oct. 6, 1942 |
| 2,113,214 | Luck | Apr. 5, 1938 |
| 2,266,401 | Reeves | Dec. 16, 1941 |
| 2,280,707 | Kell | Apr. 21, 1942 |
| 2,226,706 | Cawein | Dec. 31, 1940 |
| 2,297,926 | Usselman | Oct. 6, 1942 |
| 2,338,395 | Bartelink | Jan. 4, 1944 |

OTHER REFERENCES

Publication, "Ultra - High - Frequency Techniques," by Brainerd et al., published by Van Nostrand Co., 1942, pp. 176–182. (Copy in Div. 51.)